United States Patent
Nostry et al.

(10) Patent No.: US 10,290,218 B2
(45) Date of Patent: May 14, 2019

(54) METHOD AND SYSTEM FOR MANAGING A MULTI-DESTINATION FLIGHT PLAN

(71) Applicant: THALES, Courbevoie (FR)

(72) Inventors: Frédéric Nostry, Valence (FR); Christophe Harlez, Valence (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/424,619

(22) Filed: Feb. 3, 2017

(65) Prior Publication Data

US 2017/0263137 A1    Sep. 14, 2017

(30) Foreign Application Priority Data

Mar. 14, 2016    (FR) ...................... 16 00416

(51) Int. Cl.
| | |
|---|---|
| *G08G 5/02* | (2006.01) |
| *G01C 23/00* | (2006.01) |
| *G05D 1/10* | (2006.01) |
| *G08B 5/00* | (2006.01) |
| *G08G 5/00* | (2006.01) |

(52) U.S. Cl.
CPC .......... *G08G 5/025* (2013.01); *G01C 23/005* (2013.01); *G05D 1/101* (2013.01); *G08G 5/0034* (2013.01); *G08G 5/0039* (2013.01); *G08G 5/0047* (2013.01)

(58) Field of Classification Search
CPC .... G08G 5/025; G08G 5/0034; G08G 5/0039; G08G 5/0047; G01C 23/005; G05D 1/101
See application file for complete search history.

(56) References Cited

U.S. PATENT DOCUMENTS

| | | | | |
|---|---|---|---|---|
| 7,272,491 B1 * | 9/2007 | Berard | ................ | G06Q 10/047 701/14 |
| 8,073,578 B1 * | 12/2011 | McCusker | .......... | G08G 5/0034 701/10 |

(Continued)

FOREIGN PATENT DOCUMENTS

| | | |
|---|---|---|
| EP | 1 496 461 A1 | 1/2005 |
| FR | 2 904 448 A1 | 2/2008 |
| FR | 2 910 678 A1 | 6/2008 |

OTHER PUBLICATIONS

"Advanced Flight Management Computer System: ARINC Characteristic 702A-1," Airlines Electronic Engineering Committee, published Jan. 31, 2000.

*Primary Examiner* — Courtney D Heinle
(74) *Attorney, Agent, or Firm* — Baker & Hostetler LLP

(57) ABSTRACT

A method for managing a multi-destination flight of an aircraft comprises a first step of constructing an initial flight plan of a mission between an endmost departure point and an endmost arrival point, having a series of temporally ordered waypoints. A second step comprises selecting one or more waypoints from among the waypoints, and transforming the selected waypoint or waypoints into one or more corresponding intermediate touchdown points, each intermediate touchdown point having the same initial coordinates as the corresponding waypoint of which it is the transform, and each intermediate touchdown point comprising a computerized relationship of association with a dedicated intermediate arrival procedure, ready to be activated.

15 Claims, 6 Drawing Sheets

(56) References Cited

U.S. PATENT DOCUMENTS

| | | | |
|---|---|---|---|
| 2009/0105943 A1* | 4/2009 | Ferro | G01C 23/005 701/533 |
| 2009/0150012 A1* | 6/2009 | Agam | G01C 23/005 701/3 |
| 2010/0030404 A1* | 2/2010 | Berard | G01C 23/005 701/14 |
| 2011/0107247 A1* | 5/2011 | Cormack | G06Q 10/10 715/771 |
| 2013/0197791 A1* | 8/2013 | Struzik | G06Q 50/30 701/123 |
| 2016/0093217 A1* | 3/2016 | Hale | G08G 5/0026 701/120 |
| 2016/0093221 A1* | 3/2016 | Bailey | G08G 5/0039 701/120 |

* cited by examiner

METHOD AND SYSTEM FOR MANAGING A MULTI-DESTINATION FLIGHT PLAN

CROSS-REFERENCE TO RELATED APPLICATIONS

This application claims priority to foreign French patent application No. FR 1600416, filed on Mar. 14, 2016, the disclosure of which is incorporated by reference in its entirety.

FIELD OF THE INVENTION

The present invention relates to a method and a system for aiding the management of aircraft multi-destination flight plans.

The invention lies in the field of real-time avionics systems embedded onboard aircraft, and in particular the field of methods for managing flight plans implemented by flight management systems FMS embedded onboard the said aircraft.

The objective of the invention is to facilitate the preparation and tracking of aircraft flights within the framework of "cabotage" missions during which several destinations must be serviced.

BACKGROUND

"Cabotage" missions are typically offshore missions for which the operator or the pilot of the aircraft must take in several oil platforms so as to load or unload personnel and/or freight and to refuel if appropriate.

Currently, methods and systems for aiding the management of aircraft multi-destination flight plans proposed consist in constructing successive flight plans, formulated as the mission advances, the last flight plan undergoing formulation being designed to service just the next destination.

For example, patent application FR 2904448 A1 describes a method and a system for aiding the management of successive flights of an aircraft, each flight being carried out by a particular flight plan which comprises waypoints. For each following flight Vn+1, the system and method, described in document FR 2904448 A1, are configured to use automatically as initial data, at least certain recorded values of characteristic parameters of the destination point of the previous flight Vn, to determine the values of the various characteristic parameters relating to the said following flight Vn+1 from the origin point of the following flight up to the destination point of the following flight Vn+1.

Thus, during each touchdown, the crew and the pilot more particularly must construct and verify a new flight plan to reach the next destination.

This solution is constrained by the configurations of current FMS flight management systems which are limited to the management of a flight plan comprising a single departure airport, a set of legs and a single destination. This proposed current flight plan structure is not at present suitable for "cabotage" missions where the aircraft must, during the flight, service several touchdown points.

The solution described in document FR 2904448 A1, consisting in constructing successive flight plans, exhibits several drawbacks:

it does not make it possible to obtain the predictions for flight time and fuel consumption over the whole of a mission including touchdown points other than the current touchdown point;

it does not enable fine and optimal planning of the schedules of arrivals at the various touchdown points serviced and the possible refuelling operations;

it manages only two flight plans, having regard to the fact that the systems themselves comprise a limited number of flight plans (an active flight plan and one to three secondary flight plans), for reasons of RAM/ROM (Random Access Memory/Read Only Memory) memory size;

it monopolizes the secondary flight plan, normally dedicated to strategic modifications;

it does not enable effective insertion or deletion of intermediate destinations;

in spite of a certain automation afforded by the FMS for the integration of data of the previous flight, the construction of the following flight plan to reach the next destination leaves a still appreciable workload for the crew during the remaining successive touchdown phases to be accomplished after reaching the next destination;

the preparation of successive flight plans increases the necessary time spent on the ground.

The technical problem is to provide a method and a system for aiding the management of a single multi-destination flight plan of an aircraft which mitigate one or more of the aforementioned drawbacks.

The main technical problem is to provide a method and a system for aiding the management of a multi-destination flight plan of an aircraft which improves the planning of the schedules of arrivals at the various touchdown points serviced and/or the possible refuelling operations.

Another problem is to improve the ergonomics of the management method and the system in terms of display and input of relevant data relating to the management of multiple touchdowns within a single flight plan.

SUMMARY OF THE INVENTION

For this purpose, the subject of the invention is a method for managing a multi-destination flight of an aircraft implemented by an onboard avionics flight management system, comprising a first step consisting in constructing an initial flight plan of a mission having a start and an end on the basis of an endmost departure point, of an endmost arrival point, and of a series of temporally ordered waypoints of the aircraft between the endmost departure point corresponding to the start of the mission and the endmost arrival point corresponding to the end of the mission, the endmost departure point, the endmost arrival point and the waypoints being extracted from a navigation database of the aircraft and/or input by a crew. The management method is characterized in that it comprises a second step, executed after the first step, the second step consisting in: selecting one or more waypoints from among the waypoints defining the initial flight plan constructed, and transforming the selected waypoint or waypoints into one or more corresponding intermediate touchdown points, each intermediate touchdown point having the same initial coordinates as the corresponding waypoint of which it is the transform, and each intermediate touchdown point comprising a computer link associated with a dedicated intermediate arrival procedure, ready to be activated.

According to particular embodiments, the method for managing a multi-destination flight comprises one or more of the following characteristics:

for each intermediate touchdown point, the intermediate arrival procedure comprises a first intermediate nominal arrival procedure and a second intermediate interrupted approach procedure, the first nominal approach procedure being ready to be activated by priority with respect to the one second intermediate interrupted approach procedure;

the intermediate arrival procedure or procedures are selected from a navigation database of the aircraft and/or input by the crew, and then related to their respective intermediate touchdown point during the second step;

at least one intermediate touchdown point comprises an additional computer link associated with a dedicated intermediate departure procedure, ready to be activated, the computer link being established during the second step;

the navigation database of the aircraft comprises a first standard database containing departure and arrival procedures, airports, waypoints and beacons, published by the states and coded according to the format standardized by AEEC A424, and a pilot database containing departure and arrival procedures, airports, waypoints and beacons, created by the crew or a company to mitigate items missing from the standard database;

each touchdown point created during the second step as transform of a selected waypoint includes a set, associated with the said touchdown point, of default prediction parameters included among an estimated touchdown time, an estimated approach time, an estimated departure time, an estimation of the fuel consumed during the corresponding intermediate approach and departure phases of the approach and departure procedures, and during the touchdown phase, and a forecast of updates of the weights of fuel, of freight and of passengers, the estimated touchdown time being inserted by the crew in the form of a default setting, the estimated approach time and the estimated time being either inserted by the crew or an external mission preparation system in the form of a first approach time default setting and of a second approach time default setting, or estimated by the flight management system;

the method for managing a multi-destination flight comprises a third step, executed after the second step, the third step consisting in: activating the intermediate arrival procedure associated with the next current intermediate touchdown point, not yet reached and to be serviced, from among the intermediate touchdown points remaining to be serviced, and constructing a nominal-approach and intermediate missed-approach leg, made up of intermediate-approach paths, on the basis of the activated intermediate arrival procedure, and inserting the said constructed nominal-approach and intermediate interrupted-approach leg before the next current intermediate touchdown point, and then saving the flight plan thus modified as an updated flight plan;

when the next current intermediate touchdown point, not yet reached and to be serviced, comprises an additional computer link associated with a dedicated intermediate departure procedure, ready to be activated, the third step also consists in: activating the intermediate departure procedure associated with the next current intermediate touchdown point, not yet reached and to be serviced, and constructing an intermediate departure leg, made up of a sequence of intermediate departure paths, on the basis of the activated intermediate departure procedure, and inserting the said intermediate departure leg constructed after the next current intermediate touchdown point, not yet reached and to be serviced, and integrating the insertion of the said intermediate departure leg into the updating of the flight plan;

at the end of the third step, an updating of the trajectory predictions is performed which takes into account the insertion of the intermediate nominal approach leg or of the intermediate interrupted approach leg and if appropriate the departure leg;

the method for managing a multi-destination flight comprises a fourth step, executed after the third step and during the phase of touchdown at the current intermediate touchdown point which has just been reached, the fourth step consisting in: updating the prediction parameters at the current touchdown point relating to the weight of fuel, of freight and of passengers, and then updating the predictions over the entire flight plan in terms of time and of fuel available on the basis of the update of prediction parameters at the touchdown point and of the approach leg of the current touchdown point actually flown;

the quantity of fuel is updated automatically by the reading of one or more fuel gauges when the aircraft's avionics system so allows or is fed in by crew input during a refuelling operation;

at the end of the fourth step, the flight management system searches for whether there exists a next current intermediate touchdown point, not yet reached and to be serviced, from among the intermediate touchdown points remaining to be serviced, and in the affirmative, the execution of the third step is repeated during or after the phase of touchdown at the current intermediate touchdown point;

when a command input by the crew prescribes the deletion of a touchdown point not yet serviced, or the inverse transformation of a touchdown point not yet serviced into a corresponding waypoint, or the addition of a touchdown point before or after the next touchdown point not yet serviced, the third step is immediately executed again;

the method for managing a multi-destination flight comprises a first telescopic display step in which the intermediate touchdown point or points are distinguished from the other points of the said flight plan by a characteristic colour and/or symbol, and identified by a different identification label, and in which at a first level, the next intermediate touchdown point not yet reached is in a deployed state and in a folded-up display mode, and the other intermediate touchdown points are in a folded-up state and in a folded-up display mode; and at a second level, upon command actuated by the crew or upon automatic command, the next intermediate touchdown point not yet reached is in a deployed state and in a deployed display mode which displays the intermediate approach leg and optionally departure leg corresponding respectively to the activated intermediate arrival and departure procedures of the said next intermediate touchdown point, and the other intermediate touchdowns are in a folded-up state and in a folded-up display mode;

the method for managing a multi-destination flight comprises a second display step to implement the multi-destination management method defined hereinabove, and allow:

the direct transformation of a selected waypoint into an intermediate touchdown point with the same coordinates with the help of one or more pages of input of a computer link associated with the said selected intermediate touchdown point with a dedicated intermediate arrival procedure, ready to be activated, and optionally of an additional computer link associated with the said selected intermediate touchdown point with a dedicated intermediate departure procedure, ready to be activated, and of a set of default prediction parameters included among an estimated touchdown time, an estimated approach time, an estimated departure time, an estimation of the fuel consumed during the corresponding intermediate approach and departure phases of the approach and departure procedures, and during the touchdown phase, and a forecast of updates of the weights of fuel, of freight and of passengers; and the inverse transformation of a selected intermediate touchdown point into a waypoint with the same coordinates.

The subject of the invention is also a flight management system of an aircraft comprising: one or more electronic processing computers, means for inputting data to allow a crew to enter data into the flight management system, one or more displays to display one or more flight plans and underlying information tables relating to elements of the flight plan. The flight management system is configured to:

in a first step, construct an initial flight plan of a mission having a start and an end on the basis of an endmost departure point, of an endmost arrival point, and of a series of temporally ordered waypoints of the aircraft between the endmost departure point corresponding to the start of the mission and the endmost arrival point corresponding to the end of the mission, the endmost departure point, the endmost arrival point and the waypoints being selected from a navigation database of the aircraft and/or input by a crew; and in a second step, executed after the first step, select one or more waypoints from among the waypoints selected in the initial flight plan, and transform the selected waypoint or waypoints into one or more corresponding intermediate touchdown points, each intermediate touchdown point having the same initial coordinates as the corresponding waypoint of which it is the transform, and each intermediate touchdown point comprising a computer link associated with a dedicated intermediate arrival procedure, ready to be activated.

The subject of the invention is also a display for aiding the management of a multi-destination flight of an aircraft comprising a first display screen configured to implement the management method defined hereinabove, and allow telescopic display of the flight plan, in which display the intermediate touchdown point or points are distinguished from the other points of the said flight plan by a characteristic colour and/or symbol, and identified by a different identification label; and in which display at a first level, the next intermediate touchdown point not yet reached is in a deployed state and in a folded-up display mode, and the other intermediate touchdown points are in a folded-up state and in a folded-up display mode; and at a second level, upon command actuated by the crew or upon automatic command, the next intermediate touchdown point not yet reached is in a deployed state and in a deployed display mode which displays the intermediate approach leg and optionally departure leg corresponding respectively to the activated intermediate arrival and departure procedures of the said next intermediate touchdown point, and the other intermediate touchdowns are in a folded-up state and in a folded-up display mode.

According to particular embodiments, the display for aiding the management of a multi-destination flight of an aircraft comprises one or more of the following characteristics:

the display for aiding the management of a multi-destination flight of an aircraft comprises a second display screen, configured to implement the multi-destination management method defined hereinabove, and allow:

the direct transformation of a selected waypoint into an intermediate touchdown point with the same coordinates with the help of one or more pages of input of a computer link associated with the said selected intermediate touchdown point with a dedicated intermediate arrival procedure, ready to be activated, and optionally of an additional computer link associated with the said selected intermediate touchdown point with a dedicated intermediate departure procedure, ready to be activated, and of a set of default prediction parameters included among an estimated touchdown time, an estimated approach time, an estimated departure time, an estimation of the fuel consumed during the corresponding intermediate approach and departure phases of the approach and departure procedures, and during the touchdown phase, and a forecast of updates of the weights of fuel, of freight and of passengers;

the inverse transformation of a selected intermediate touchdown point into a waypoint with the same coordinates;

the first display screen and the second display screen are one and the same display screen.

BRIEF DESCRIPTION OF THE DRAWINGS

The invention will be better understood on reading the following description of several embodiments which is given solely by way of example and while referring to the drawings in which.

DETAILED DESCRIPTION

The underlying concept of the method according to the invention for managing a multi-destination flight of an aircraft consists in managing, not successive flight plans, but a single active flight plan which comprises intermediate touchdowns.

The method for managing a multi-destination flight according to the invention implements a novel function of creating and inserting one or more intermediate touchdown points in one and the same flight plan and of associating intermediate departure and arrival procedures therewith.

Furthermore, the novel function is configured to associate with the intermediate touchdown points respective default settings for touchdown time, fuel consumption, variation of weights and variation of fuel so as to allow the computation of the predictions over the entire flight plan up to the end of the mission.

Figure 1:
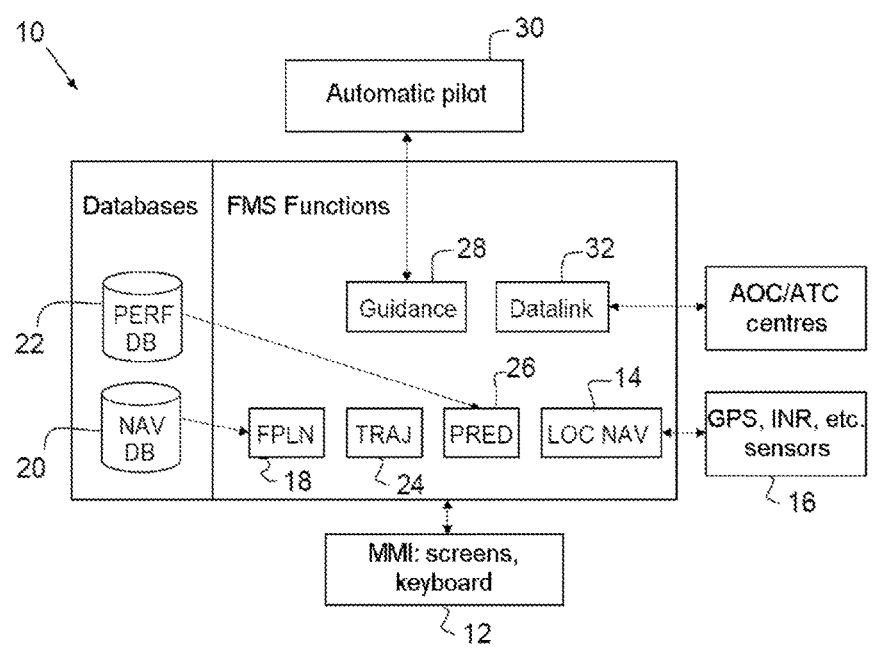
FIG. 1 is a view of a system for managing a multi-destination flight of FMS type for an aircraft, configured to implement a method for managing a multi-destination flight of the aircraft according to the invention.

According to FIG. 1 and a functional representation of aflight management system for an aircraft, a flight management system FMS 10, based on one or more electronic computers, has an MMI man-machine interface 12 comprising input means, made up of a keyboard for example, and display means, made up of a display screen for example, or else simply a touch-sensitive display screen, as well as modules fulfilling the various functions described in the ARINC 702 standard entitled "Advanced Flight Management Computer System", of December 1996. The method according to the invention can be carried out within the framework of an architecture which is comparable, but not restricted to the latter. The FMS flight management system 10 FMS is configured to implement all or part of the functions of the ARINC 702 standard with the help of the following various modules:

a navigation module 14, called LOCNAV, for performing optimal location of the aircraft as a function of geo-location means 16 such as GPS, GALILEO or satellite-based geo-positioning, VHF (Very High Frequency) radionavigation beacons, inertial platforms. This module communicates with the aforementioned geo-location devices;

a module for determining flight plans 18, called "FPLN", for inputting the geographical elements constituting the skeleton of the route to be followed, such as the points imposed by the departure and arrival procedures, the waypoints, the "airways";

a navigation database 20, called NAVDB, for constructing geographical routes and procedures using data included in the bases relating to the points, beacons, and to the portions of trajectories, also called "legs" of interception or of altitude . . . ;

a performance database 22, called PERF DB, containing information relating to the aerodynamic parameters and to the performance of the engines of the aircraft, as well as to its domain of employment or, flight model;

a lateral trajectory determination module 24, called TRAJ, for constructing a continuous trajectory on the basis of the points of the flight plan, complying with the performance of the aircraft and the confinement constraints (RNP for example);

a prediction module 26, called PRED, for constructing an optimized vertical profile over the lateral trajectory, and giving the estimations of distance, time, altitude, speed, fuel and wind notably over each point, at each change of piloting parameter and at each change of destination, and which will be displayed to the crew. The functions forming the subject of the invention affect notably this part of the computer and it should be noted that the modules 24 and 26 can be integrated into a single module TRAJ-PRED which globally handles the lateral and vertical computations;

a guidance module 28, called GUIDANCE, for guiding the aircraft on its three-dimensional trajectory in the lateral plane and the vertical plane, while complying with the speed, with the aid of the information computed by the prediction module 26. In an aircraft equipped with an automatic piloting device 30, the latter exchanges information with the guidance module 28;

a digital data transport link means 32, called DATALINK, for exchanging flight information between the flight plan module and prediction module and the control centres, the airline, or other aircraft 34.

On the basis of the flight plan defined by the pilot, in the form notably of a list of waypoints, the lateral trajectory is computed as a function of the geometry between the waypoints or paths of a "leg" and/or the altitude and speed conditions which are used for computing a turning radius for example.

Over this lateral trajectory, the flight management system FMS optimizes a vertical trajectory, in terms of altitude and speed, passing through possible altitude, speed and time constraints.

The set of information entered or computed by the flight management system is grouped together on one or more display screens of the MMI man-machine interface 12 in the form of display pages known to the person skilled in the art, for example CDU (Control and Display Unit), MCDU ("Multipurpose Control and Display Unit), MFD (Multi Function Display), ND (Navigation Display), PFD (Primary Flight Display), HUD (Head-Up Display) or other pages.

The flight management system, in the guise of flight plan dedicated system, is configured to manage the trajectory and the predictions for display and guidance.

It should be noted that the flight plan can be inserted and modified via an MCDU (Multipurpose Control and Display Unit) or via a more integrated MMI managing several systems.

The flight plan can also be constructed by a mission preparation system and transmitted to the FMS via the DATALINK link means 32 or an external medium.

Figure 2:
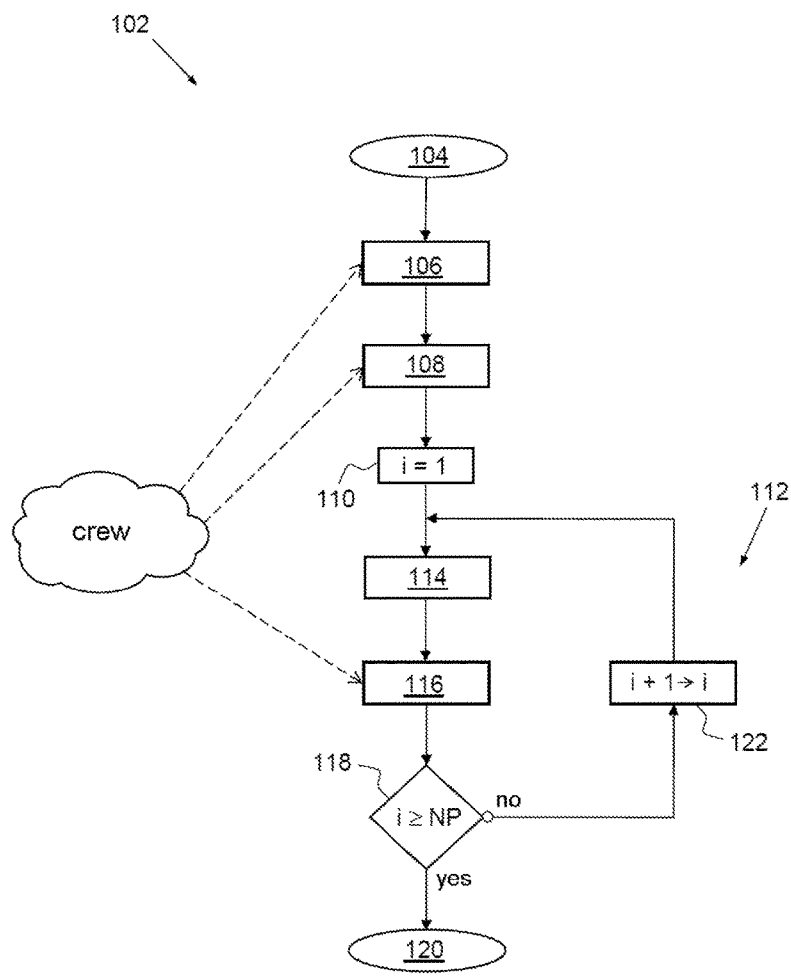
FIG. 2 is a flowchart of a method for managing a multi-destination flight of an aircraft according to the invention, the said method for managing a multi-destination flight being implemented by the management system of FIG. 1.

According to FIG. 2 and embodiment of the invention, a method 102 for managing a multi-destination flight of an aircraft, implemented by an onboard avionics flight management system such as for example that of FIG. 1, comprises a set of steps.

In a first step 106, following an initial step 104 of launching the management method 102, an initial flight plan of a mission having a start and an end of mission is constructed with the aid of the flight management system.

The construction 106 of the initial flight plan is performed on the basis of the provision of an endmost departure point of the flight plan and of an associated endmost departure procedure, of an endmost arrival point of the flight plan and of an associated arrival procedure, and of a series of aircraft waypoints, or leg, ordered temporally between the endmost departure point corresponding to the start of the mission and the endmost arrival point corresponding to the end of the mission.

The endmost departure point, the endmost arrival point and the waypoints are selected from the navigation database 20 of the aircraft and/or input by a crew.

For example, here the crew initializes the flight plan using elements of the navigation database.

The crew defines all the waypoints necessary for the mission and then selects here a departure procedure and an arrival procedure, associated respectively with the endmost departure point and with the endmost arrival point.

The navigation data database 20 of the aeroplane comprises:

a list of procedures published by the states, coded according to the standardized A424 format of the AEEC ("Airline Electronic Engineering Committee"), airports, beacons and waypoints making up the database commonly called a "standard database";

procedures, points, beacons, airports, runways created by the crew or the company, to mitigate the items missing from the published procedures. They are coded in proprietary format by the FMS designers, optionally produced in the A424 format. One then speaks of a "pilot database"

The structure of the initial flight plan such as defined in ARINC 424 is typically composed by stringing together series of points as follows:

a departure point on the ground designated by FROM, in general an airport, or a current flight position, designated by PPOS, when the craft is in flight a departure procedure composed of paths ("legs") designated by SID1 ("Standard Instrument Departure" #1), ..., SIDn waypoints designated by WPT1, WPTn;

an endmost arrival procedure consisting of the elements named in the A424 format STAR ("Standard Terminal Arrival Route"), VIA (junctions between the STARs and the approaches APP), APP ("Approach") and consisting of the paths or legs designated by STAR1, ... STARn, VIA1, ..., VIAn, APP1, ..., APPn a final destination or endmost arrival point, an airport runway or an airport, designated by Rwy or Arpt;

an interrupted approach procedure MAP (or "Missed Approach") consisting of points of interrupted approach, designated by MAP1, ..., MAPn.

As a variant, the construction of the initial flight plan is performed on the basis of the provision of an endmost departure point of the flight plan without any associated endmost departure procedure, of an endmost arrival point of the flight plan without any associated arrival procedure, and of a series of waypoints of the aircraft, ordered temporally between the endmost departure point corresponding to the start of the mission and the endmost arrival point corresponding to the end of the mission.

Thereafter in a second step 108, the crew selects one or more waypoints from among the waypoints extracted from the navigation database or input by the crew during the step 106 of constructing the initial flight plan, to transform them into touchdown points.

The flight management system transforms the selected waypoint or waypoints into one or more corresponding intermediate touchdown points. Each intermediate touchdown point possesses the same initial coordinates as the corresponding waypoint of which it is the transform, and each intermediate touchdown point comprises a computer link associated with a dedicated intermediate arrival procedure, ready to be activated.

The intermediate arrival procedure comprises a first intermediate nominal arrival procedure and a second intermediate missed approach procedure, the second intermediate missed approach procedure being ready to be activated in case of an event liable to compromise the intermediate nominal arrival.

The intermediate arrival procedure or procedures are selected from the navigation database of the aircraft and/or input by the crew, and then related to their respective intermediate touchdown point.

The intermediate arrival procedure consists for example of a published procedure if dealing with an airport of the standard database, a specific procedure formulated by the FMS if dealing with an airport of the pilot database or an offshore platform.

At least one intermediate touchdown point comprises an additional computer link associated with a dedicated intermediate departure procedure, ready to be activated, the computer link being established during the second step.

The intermediate touchdown points selected are the points of the route that have to be serviced in the course of the mission.

During this lateral revision performed by the team, the crew associates, for each intermediate touchdown point, via the interface for inputting and displaying the default prediction parameters included in the set made up of: an estimated touchdown time, an estimated approach time, an estimated departure time, an estimation of the fuel consumed during the corresponding intermediate approach and departure phases of the approach and departure procedures, and during the touchdown phase, and a forecast of updates of the weights of fuel (including a possible refuelling), of freight and of passengers.

Thus each touchdown point, created during the second step as transform of a selected waypoint, comprises default prediction parameters included among an estimated touchdown time, an estimated approach time, an estimated departure time, an estimation of the fuel consumed during the corresponding intermediate approach and departure phases of the approach and departure procedures, and during the touchdown phase, and a forecast of updates of the weights of fuel, of freight and of passengers.

The estimated touchdown time is inserted by the crew in the form of a default setting.

The estimated approach time and the estimated arrival time are either inserted by the crew or an external mission preparation system in the form of a first approach time default setting and of a second approach time default setting, or are estimated by the flight management system.

For example, during the implementation of the second step, an intermediate point of the initial flight plan WPTk is selected via the MMI and transformed as an "intermediate touchdown point" in the flight plan.

Thus, the modified flight plan subsequent to this selection and transformation has the following structure:

FROM (airport) when the aircraft is on the ground or the current position (PPOS) when the aircraft is in flight departure procedure composed of the legs SID1, ..., SIDn series of waypoints designated by: WPT1, ..., WPT(k−1)

intermediate touchdown point WPTk series of waypoints designated by: WPT(k+1), WPTn;

arrival procedure consisting of the STAR, VIA, APP and consisting of the legs STAR1, ... STARn, VIA1, ..., VIAn, APP1, ... APPn;

destination or final or endmost arrival point, an airport runway or an airport, designated by Rwy or Arpt;

interrupted approach procedure (or "Missed Approach") consisting of the legs designated by MAP1, ..., MAPn.

The second step 108 by allowing the crew the creation of an informational object, called an "intermediate touchdown point", and the association for each intermediate touchdown point, for example here for the touchdown point WPTk, of the following parameters:

an estimated touchdown time an estimation of the quantity of fuel consumed during the approach procedure and touchdown phases;

a forecast of differential updates of the weights of fuel, of freight and of passengers.

Predictions over the entire flight plan of the mission can thus be computed by the flight management system FMS.

A default setting is inserted for the time spent on the ground while the aircraft is actually down ("landing time"). Another default setting, decomposed into a first default setting and a second default setting, can also be inserted for the flight time necessary for the intermediate approach procedure (or "arrival time") and the intermediate departure procedure (or "departure time") or else the intermediate-procedure times are estimated by the FMS.

During the implementation of the second step 108, as many intermediate touchdown points as intermediate destinations desired by the crew for the accomplishment of the mission can be inserted into the flight plan.

For example, a modified flight plan following the insertion of three intermediate touchdown points, designated by WPTk, WPTm, WPTt has the following structure:

FROM (airport) when the aircraft is on the ground or current position (PPOS) when the aircraft is in flight departure procedure composed of the legs SID1, ... SIDn series of waypoints designated by: WPT1, ..., WPT(k−1)

first intermediate touchdown point WPTk series of waypoints designated by WPT(k+1), ..., WPT(j−1)

second intermediate touchdown point WPTj series of waypoints designated by WPT(j+1), ..., WPT(t−1)

third intermediate touchdown point WPTt series of waypoints designated by WPT(t+1), ..., WPTn arrival procedure consisting of STAR, VIA, APP and consisting of the legs STAR1, ... STARn, VIA1, ..., VIAn, APP1, ... APPn final destination or endmost arrival point, an airport runway or an airport, designated by Rwy or Arpt interrupted approach procedure consisting of the legs designated by MAP1, ..., MAPn.

By taking into account these enriched data structures for the intermediate touchdown points, the crew can be offered an overview of the flight plan with the set of predictions of transit time and of quantity of fuel remaining throughout the flight.

Taking these into account also makes it possible to plan possible refuellings.

Taking these into account makes it possible to limit the workload of the crew and avoids piecemeal construction of successive flight plans.

Thereafter, following the second step 108, in a step 110 of initializing a counter of a loop 112 of steps, a counter i of traversal of the next intermediate touchdown point, not yet reached and to be serviced, ordered temporally according to the flight plan in a list of touchdown points to be serviced, is set to the unitary value by the flight management system.

Next, in a third step 114, executed after the second step 108 and the step 110 of initializing the counter, the intermediate arrival procedure, associated with the next current intermediate touchdown point of rank i, not yet reached and to be serviced, from among the intermediate touchdown points remaining to be serviced, is activated automatically by the flight management system FMS.

Thereafter, in the course of the same third step 114, a nominal approach and intermediate interrupted approach leg (or "intermediate arrival pattern"), made up of intermediate-approach paths, on the basis of the activated intermediate arrival procedure, is constructed, and then inserted immediately before the next current intermediate touchdown point of rank i. The flight plan thus modified is saved as an updated flight plan.

In an optional manner, when the next current intermediate touchdown point of rank i, not yet reached and to be serviced, comprises an additional computer link associated with a dedicated intermediate departure procedure, ready to be activated, the third step 114 also implements the following sub-steps consisting in:

activating the intermediate departure procedure associated with the next current intermediate touchdown point of rank i, not yet reached and to be serviced, and constructing an intermediate departure leg (or "intermediate departure pattern"), made up of a sequence of intermediate departure paths (or legs), on the basis of the activated intermediate departure procedure, and inserting the said intermediate departure leg constructed after the next current intermediate touchdown point, not yet reached and to be serviced, and integrating the insertion of the said intermediate departure leg into the updating of the flight plan.

At the end of the third step 114, an updating of the trajectory predictions is performed which takes into account the insertion of the intermediate nominal approach leg or of the intermediate interrupted approach leg and if appropriate the departure leg.

Thus, during the activation of the intermediate arrival procedure and the insertion of the intermediate approach leg corresponding to the next touchdown point of rank i, the default setting in terms of time and fuel relating to the intermediate arrival procedure is replaced with the computation of the predictions along the approach leg. The prediction computations over the entire flight plan are reupdated as a function of the approach leg (or pattern), entailing the flight time and the fuel consumption.

The third step 114 of the management method 102 allows the crew to define intermediate-approach legs, either by inserting approach legs codified according to the A424 format of the associated published procedure, when the next "intermediate touchdown point" is defined as an airport in list of the published procedures of the navigation database, or by constructing a leg according to certain pilot or company rules, when the next "intermediate touchdown point" is a point of the "Pilot database".

According to a first case, when the next intermediate touchdown point, designated by WPTk, is an airport of the A424 database of the procedures published by a state, the flight plan, obtained following the activation of the intermediate arrival and departure procedures (approach leg and landing, re-takeoff and departure leg), possesses for example the following structure:

FROM (airport) when the aircraft is on the ground or current position (PPOS) of the aircraft when the aircraft is in flight departure procedure composed of the legs SID1, ..., SIDn series of waypoints designated by WPT1, ..., WPT(k−1)

intermediate arrival procedure STARk, VIAk, APPk consisting of legs STARk1, ..., STARkp, VIAk1, ..., VIAkn, APPk1, ..., APkp first intermediate touchdown point WPTk, here assumed to be next current touchdown point, intermediate re-takeoff procedure SIDk consisting of legs SIDk1, ..., SIDkn series of waypoints designated by WPT(k+1), ..., WPT(m−1)

second intermediate touchdown point WPTm series of waypoints designated by WPT(m+1), ..., WPT(t−1)

third intermediate touchdown point WPTt series of waypoints designated by WPT(t+1), ..., WPTn endmost arrival procedure consisting of STAR, VIA, APP and consisting of legs STAR1, ... STARn, VIA1, ..., VIAn, APP1, APPn final destination or endmost arrival point, an airport runway or an airport, designated by Rwy or Arpt interrupted approach procedure consisting of the legs MA1, . . . , MAn According to a second case, when the next intermediate touchdown point, designated by WPTk, is an airport of the pilot database, an approach leg is formulated by the FMS, and then inserted into the flight plan. The modified flight plan following the insertion of the approach leg has the following structure:

FROM (airport) when the aircraft is on the ground or current position (PPOS) when the aircraft is in flight departure procedure composed of the legs SID1 . . . , , SIDn series of waypoints designated by WPT1, . . . , WPT(k−1)

intermediate arrival procedure (including an interrupted approach procedure) APPk1 . . . APPkp/MAPk1 . . . MAPkp first intermediate touchdown point WPTk, here assumed to be next current touchdown point, series of waypoints designated by WPT(k+1), . . . , WPT(m−1)

second intermediate touchdown point WPTm series of waypoints designated by WPT(m+1), . . . , WPT(t−1)

third intermediate touchdown point WPTt series of waypoints designated by WPT(t+1), . . . , WPTn endmost arrival procedure consisting of STAR, VIA, APP and consisting of the legs STAR1, . . . , STARn, VIA1, . . . , VIAn, APP1, . . . , APPn final destination or endmost arrival point, an airport runway or an airport, designated by Rwy or Arpt interrupted approach procedure consisting of the legs MAP1, . . . , MAPn It should be noted that in the first and second cases of the examples described hereinabove, the next current touchdown point of rank i to be serviced is assumed to be the first touchdown point WPTk.

In both these cases, for the display of the flight plan on the MMIs (CDU, MSI) during the first traversal of the third step 114, the "touchdown points" situated after the first intermediate touchdown point WPTk, in the guise of next current intermediate touchdown point of rank 1, are then identified as "folded up" by the management method 102 and the display (including the endmost destination of the initial flight plan).

The next current intermediate "touchdown point", here of rank 1, of the flight plan, that is to say the first intermediate touchdown point WPTk, is identified as "unfolded" by the display of the management method and as next destination to be serviced.

As the flight proceeds, when the touchdown point corresponding to the current rank i of the loop 112 has been sequenced and reached, the following touchdown point will be placed in "unfolded" display mode so as to be presented to the crew.

When a command input by the crew prescribes the deletion of a touchdown point not yet serviced, or the inverse transformation of a touchdown point not yet serviced into a corresponding waypoint, or the addition of a touchdown point before or after the next touchdown point not yet serviced, the third step 114 is immediately executed again.

For example, according to a third case, when a new intermediate touchdown point is created at the current instant on the basis of an existing waypoint WPTj already inserted into the flight plan and when this new intermediate touchdown point WPTj is situated before the intermediate touchdown point WPTk, considered up to this current instant as the next current intermediate touchdown point, then the new intermediate touchdown point WPTj becomes the next intermediate destination. The new intermediate touchdown point WPTj created is placed in an unfolded state and display mode while the following intermediate touchdown point WPTk is placed in a folded-up state and display mode.

Thus the modified flight plan following the insertion of the new intermediate touchdown point WPTj has the following structure:

FROM (airport) when the aircraft is on the ground or current position (PPOS) when the aircraft is in flight endmost departure procedure composed of the legs SID1, . . . SIDn series of waypoints designated by WPT1, . . . , WPT(j−1)

intermediate arrival procedure APPj1 . . . APPjn/MAj1 . . . MAjp associated with the new intermediate touchdown point WPTj new intermediate touchdown point WPTj, inserted before the intermediate touchdown point WPTk, and assumed here to be the first and the next current intermediate touchdown point series of waypoints designated by WPT(j+1), . . . , WPT(k−1)

second intermediate touchdown point WPTk series of waypoints designated by WPT(k+1), WPT(m−1)

third intermediate touchdown point WPTm series of waypoints designated by WPT(m+1), . . . , WPT(t−1)

fourth intermediate touchdown point WPTt series of waypoints designated by WPT(t+1), . . . , WPTn endmost arrival procedure consisting of STAR, VIA, APP and consisting of the legs STAR1, . . . STARn, VIA1, . . . , VIAn, APP1, . . . APPn final destination or endmost arrival point, an airport runway or an airport, designated by Rwy or Arpt interrupted approach procedure consisting of the legs MAP1, . . . , MAPn The default settings inserted at the intermediate touchdown point WPTk, downgraded to the folded-up state, are again used for the prediction computations by the flight management system FMS.

According to a fourth case, when a new intermediate touchdown point is created at the current instant on the basis of an existing waypoint WPTj, already inserted into the flight plan, and when this new intermediate touchdown point WPTj is situated after the intermediate touchdown point WPTk, considered up to this current instant as the next current intermediate touchdown point, the intermediate touchdown point WPTk remains the next intermediate touchdown point to be serviced. The new intermediate touchdown point WPTj created is placed in a folded-up state and display mode. The default settings associated with the new intermediate touchdown point created WPTj are used for the prediction computations of the FMS.

Thus the modified flight plan following the insertion of the new intermediate touchdown point WPTj has the following structure:

FROM (airport) or current position (PPOS) when the craft is in flight endmost departure procedure composed of the legs SID1, . . . SIDn series of waypoints designated by WPT1, . . . , WPT(k−1)

intermediate arrival procedure APPk1 . . . APPkn/MAk1 . . . MAkp first intermediate touchdown point WPTk series of waypoints designated by WPT(k+1), . . . , WPT(j−1)

new intermediary intermediate touchdown point WPTj, inserted after the intermediate touchdown point WPTk, and assumed here to be the second intermediate touchdown point series of waypoints designated by WPT(j+1), . . . , WPT(m−1)

third intermediate touchdown point WPTm series of waypoints designated by WPT(m+1), . . . , WPT(t−1)

fourth intermediate touchdown point WPTt series of waypoints designated by WPT(t+1), . . . , WPTn arrival procedure consisting of STAR, VIA, APP and consisting of the legs STAR1, . . . , STARn, VIA1, . . . , VIAn, APP1, . . . , APPn final destination or endmost arrival point, an airport runway or an airport, designated by Rwy or Arpt interrupted approach procedure consisting of the legs MAP1, . . . , MAPn The new intermediate touchdown point is placed in a folded-upstate and display mode. The default settings inserted and associated with the new intermediate touchdown point WPTk created are used for the prediction computations by the flight management system FMS.

It should be noted that when a next current intermediate touchdown point, for example the point WPTj, is reconfigured as a waypoint, its approach leg as well as the associated missed approach and associated departure procedure are deleted and the point WPTj is placed in a folded-up state. Then the following intermediate touchdown point, for example WPTk, becomes the next intermediate touchdown point and the latter is unfolded in the flight plan.

Thereafter in a fourth step 116, executed after the third step 114 and during the phase of touchdown at the current intermediate touchdown point which has just been reached, the following sub-steps are implemented:

the prediction parameters at the current touchdown point relating to the weight of fuel, of freight and of passengers are updated, and then the predictions over the entire flight plan in terms of time and fuel available are updated by the FMS on the basis of the update of prediction parameters at the touchdown point and of the approach leg actually flown of the current touchdown point.

The quantity of fuel is updated automatically by the reading of one or more fuel gauges when the aircraft's avionics system so allows or is fed in by crew input during a refuelling operation.

At the end of the fourth step 116, the flight management system searches for whether there exists a next current intermediate touchdown point, not yet reached and to be serviced, from among the intermediate touchdown points remaining to be serviced, and in the affirmative, the execution of the third step 114 is repeated during or after the phase of touchdown at the current intermediate touchdown point.

For example, the updating of the prediction parameters along the entire flight plan, performed in the course of the fourth step 116, is described hereinbelow through the following sub-steps:

FROM (airport) or current position (PPOS) when the craft is in flight: FMS conventional predictions of ETA: Take-off time, EFOB: FOB;

departure procedure: composed of legs SID1, . . . SIDn: FMS conventional predictions;

series of waypoints WPT1, . . . , WPT(k−1): FMS conventional predictions with the computation of the ETAs and EFOBs for all the waypoints of the flight plan WPT1 to WPT(k−1);

intermediate arrival procedure APP1 . . . APPn: FMS conventional predictions by the computation of the ETAs and EFOBs for all the points of the approach;

intermediate touchdown point WPTk: the transit time (ETA) at the intermediate touchdown point is equal to the sum of the predicted transit time at the last point of the approach arising from conventional predictions and of the estimated touchdown time; the quantity of fuel at the touchdown point (EFOB) is equal to the sum of the quantity of fuel predicted at the last point of the approach arising from conventional predictions, of the estimation of the fuel consumed during the touchdown phase, and of the forecast of updates of the weights of fuel, cargo and pax;

intermediate departure procedure DEPk1 . . . DEPkn: default procedure time and default consumption over the intermediate departure phase;

waypoints WPT(k+1), . . . , WPT(j−1): FMS conventional predictions;

intermediate touchdown point WPTj: no prediction in altitude and in speed on the "default" touchdown points; the transit time at the default touchdown point is equal to the sum of the transit time predicted at the last point arising from conventional predictions, of the procedure time and of the estimated touchdown time; the quantity of fuel at the default touchdown point is equal to the sum of the quantity of fuel predicted at the last point arising from conventional predictions, of the estimation of the fuel consumed during the procedure phase and touchdown phase, and of the forecast of updates of the weights of fuel, of freight and of passengers;

series of waypoints WPT(j+1), . . . , WPTn: FMS conventional predictions;

arrival procedure consisting of STAR, VIA, APP consisting of legs STAR1, . . . STARn, VIA1, . . . , VIAn, APP1, . . . APPn: FMS conventional predictions;

endmost arrival point (runway or airport), Rwy or Arpt: FMS conventional predictions;

interrupted approach procedure (Missed Approach) consisting of the points MAP1, . . . , MAPn: FMS conventional predictions It should be noted that the interrupted approach procedure is not taken into account in the prediction computations as long as it is not activated by the crew (and therefore not flown). If it is activated, the mechanisms of the FMS integrate it into the flight plan for the trajectory and prediction computations.

At the touchdown point, the crew feeds in the effective weight parameters for the updating of the prediction parameters.

The quantity of fuel on board is updated automatically by reading of the fuel gauges if the avionics system so allows, otherwise the crew feeds in the fuel manually following a refuelling operation.

At the intermediate touchdown point, an automatic or crew-controlled mechanism makes it possible to unfold the following departure and arrival patterns and to update the predictions over the rest of the flight plan. The predictions on the departure and arrival phases which were based on default settings when they were "folded up", become FMS conventional predictions.

After the completion of the fourth step 116 and while the aircraft is down on the current intermediate touchdown point which has been reached, it is verified in a test step 118 whether the current touchdown point reached is the last of the intermediate touchdown points by comparing the current index i with the number NP of intermediate touchdown points.

If the last intermediate touchdown point has been reached, the flight is continued in a conventional manner up to the final destination point in an end of flight management step 120.

If there exists a next intermediate touchdown point to be serviced, the current index of the next intermediate touchdown point not yet reached is incremented by one unit in a step 122 of incrementing the index i, and steps 114, 116, 118 of the loop 112 are repeated.

The method for managing a multi-destination flight of an aircraft 102, described in FIG. 2, makes it possible to manage the touchdown times of the intermediate touchdown points automatically through the flight management system FMS.

The management method 102 facilitates the implementation of the plan in a "legacy" flight management system (ARINC 702) by reason of the fact that the flight plan does not comprise more than one endmost arrival procedure.

Furthermore, the management procedure 102 makes it possible to reduce the load of the crew since the deployment of the successive departure and arrival procedures at the touchdown points is done automatically as the flight progresses. The entire construction of the flight plan can be done on the ground before departure or by virtue of mission preparation software and then be loaded via a data link (data-Link) in the FMS.

Furthermore, the management method 102 facilitates the reading of the flight plan by enabling the crew to see the next approach of the forthcoming touchdown point and the remainder of the flight in one and the same single flight plan. To-and-fro management between several flight plans is dispensed with and the use of a secondary flight plan for the remainder of the flight is avoided.

Moreover, in the case where the number of legs of a procedure is significant and fills the overall capacity of the flight plan in terms notably of the memory capacity occupied, the management method according to the invention makes it possible to keep a reckoning, in the flight plan, of just a single terminal procedure (departure and or arrival) at a time.

The management method 102 described hereinabove is applicable in respect of all types of mission requiring multiple landings.

According to a variant of the method 102 of the invention described in FIG. 2, the method for managing a multi-destination flight plan of an aircraft, implemented by the onboard flight management system of FIG. 1, comprises an additional step of modifying the endmost arrival point and of supplementing the initial flight plan with an additional endmost flight segment.

In the course of this additional step which takes place after the second step 108, a new endmost arrival point of the flight plan is added in replacement for the previous endmost arrival point which then becomes an intermediate touchdown point.

In the course of this same additional step, an additional flight segment is added between the previous endmost arrival point and the new endmost arrival point, with the addition of an intermediate departure procedure, of an endmost arrival procedure, and if appropriate of one or more additional waypoints.

Figure 3:
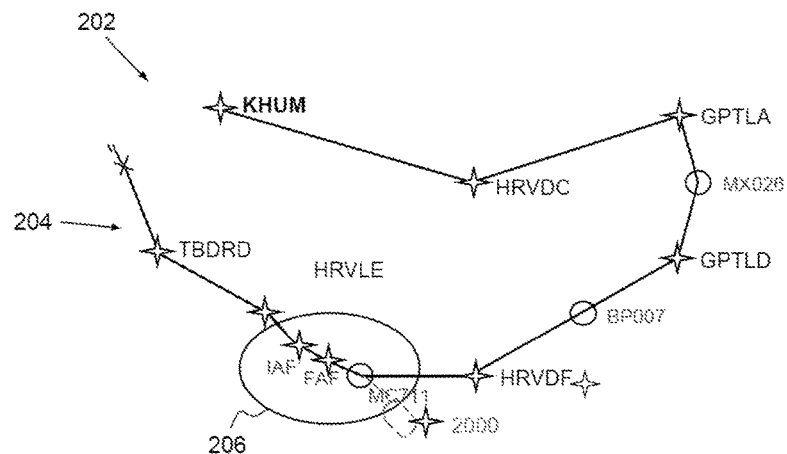
FIG. 3 is a view of a display according to the invention by a first display screen of a multi-destination active flight plan of an aircraft.

According to FIG. 3, a display 202 for aiding the management of a multi-destination flight of an aircraft, in the guise of part of the MMI man-machine interface 12, comprises a first display screen 204 which is configured to implement the management method such as described in FIG. 2 and to allow telescopic display of the flight plan.

The intermediate touchdown point or points, here the points designated by the labels MC711, BP007, MX026, are distinguished from the other points of the said flight plan by their own colour or signposting symbol, here a circle. The intermediate touchdown point or points are identified by their different identification label, here MC711, BP007, MX026.

At a first level which is not the one represented in FIG. 3, the next intermediate touchdown point not yet reached, assumed for example to be the point MC711, is in a deployed state, that is to say exhibits an inserted intermediate approach leg, and is in a folded-up display mode (the intermediate approach leg is not displayed), the other intermediate touchdown points being in a folded-up state and in a folded-up display mode.

At a second level which is the one represented in FIG. 3, upon command actuated by the crew or upon automatic command, the next intermediate touchdown point not yet reached MC711 is in a deployed state and in a deployed display mode which displays the intermediate approach leg 206 corresponding to the activated arrival procedure of the said next intermediate touchdown point MC711. The other intermediate touchdown points are for their part in a folded-up state and in a folded-up display mode. It should be noted that in this second display level, a departure leg corresponding to an activated intermediate departure procedure if it exists can be displayed.

Thus according to the telescopic display of the multi-destination management method, it is apparent that the arrival procedure at the next intermediate touchdown point MC711 has indeed been inserted into the flight plan, the other intermediate arrival procedures at the intermediate touchdown points BP007, MX026 not having yet been activated.

Figure 4A:
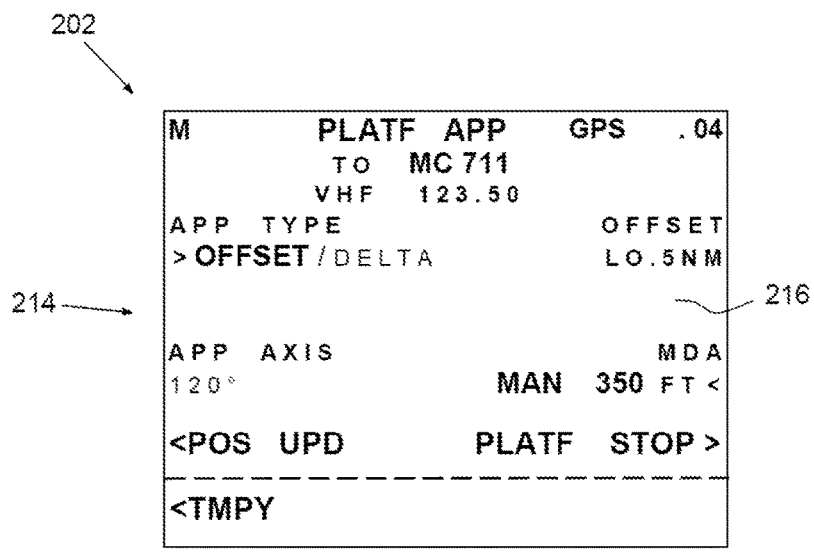
FIGS. 4A and 4B are the respective views of a first page and of a second page of display by a second display screen of the informational content input of an intermediate touchdown point in the guise of informational object according to the invention.
Figure 4B:
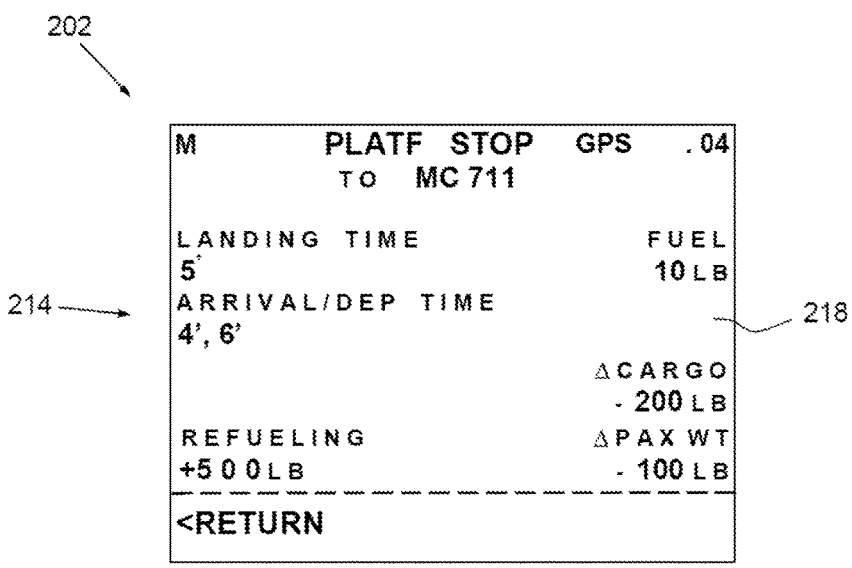

According to FIGS. 4A and 4B, the display 202 for aiding the management of a multi-destination flight comprises a second display screen 214 which is configured to implement the multi-destination management method such as described in FIG. 2, and to allow the direct transformation of a selected waypoint, here the point designated by MC711, into an intermediate touchdown point with the same coordinates with the help of one or more input pages, here a first page 216 and a second page 218 represented respectively in FIGS. 4A and 4B.

The first page 216 for inputting and displaying the state of the parameters of the intermediate touchdown point MC711 is configured for inputting a computer link associated with the said selected intermediate touchdown point with a dedicated intermediate arrival procedure, ready to be activated, and optionally of an additional computer link associated with the said selected intermediate touchdown point with a dedicated intermediate departure procedure, ready to be activated.

The second page 218 of the state of the parameters of the intermediate touchdown point MC711 is configured for inputting a set of default prediction parameters included among an estimated touchdown time, an estimated approach time, an estimated departure time, an estimation of the fuel consumed during the corresponding intermediate approach and departure phases of the approach and departure procedures, and during the touchdown phase, and a forecast of updates of the weights of fuel, of freight and of passengers.

It should be noted that the second display screen 214 is also configured to allow the inverse transformation of a selected intermediate touchdown point into a waypoint with the same coordinates.

It should be noted that the second display screen is also configured to display pages of tables of prediction parameters for the state of the aircraft as a function of the sequenced points of the flight plan. In these tables a graphical symbol may be affixed for example alongside the intermediate touchdown points to indicate that these are intermediate touchdown points in a "folded up" state, such as for example the intermediate touchdown points BP007 and MX026 of FIG. 3.

It is possible to consult and to update the prediction parameters by a lateral revision on the touchdown point.

Figure 5:
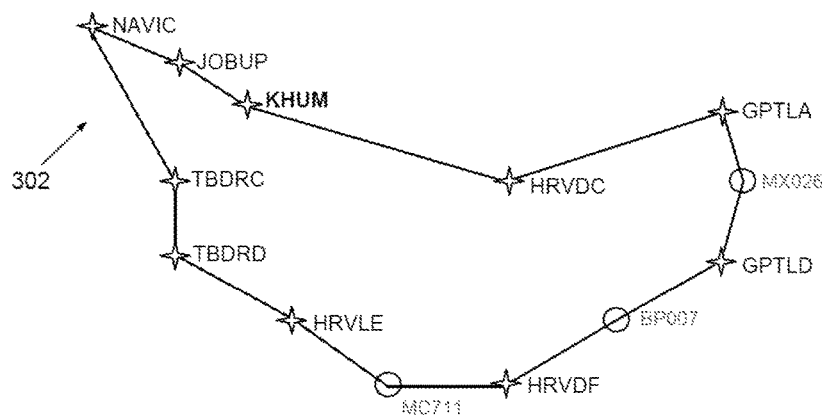
FIG. 5 is a view of an example of a single multi-destination flight plan according to the invention in which the display makes it possible to distinguish the intermediate touchdown points from the other points, and in which the display mode of all the intermediate touchdown points is a folded-up mode, including for the next intermediate touchdown point which is in a deployed state.

According to FIG. 5, a first-level version 302 of the telescopic display of the same flight plan as that of FIG. 3 is illustrated. The flight plan has been formulated with the multi-destination flight plan management method 102. The flight plan describes a closed loop in which the endmost departure point of the mission and the endmost arrival point of the mission are one and the same point designated by KHUM.

Three intermediate touchdown points are to be serviced: a first intermediate touchdown point, a second intermediate touchdown point, a third intermediate touchdown point, designated respectively by MC711, BP007 and MXX026.

A first series of waypoints, designated by JOBUP, NAVIC, TBDRC, TBDRD, HRVLE describes a first route of the flight plan connecting the endmost departure point KHUM to a first intermediate touchdown point MC711.

A second series of waypoints, limited to a single waypoint, designated by HRVDF, describes a second route of the flight plan connecting the first intermediate touchdown point MC711 to the second intermediate touchdown point BP007.

A third series of waypoints, limited to a single waypoint, designated by GPTLD, describes a third route of the flight plan connecting the second intermediate touchdown point BP007 to the third intermediate touchdown point MX026.

A fourth series of waypoints, designated by GPTLA, HRVDC describes a fourth route of the flight plan connecting the third intermediate touchdown point MX026 to the endmost arrival point KHUM.

The single flight plan, formulated by the management method 102 according to the invention, makes it possible to service all the destinations envisaged during the mission.

Several waypoints of the flight plan can have the characteristics of a touchdown point such as an offshore platform, a heliport or an airport.

The management method 102 according to the invention for a single flight plan ensures continuity of the computations for predicting the parameters of the flight over the entire mission, the transit times at each waypoint, the speed and the altitude of the aircraft, the weight of fuel, and the overall weight of the aircraft.

According to FIGS. 6A-6D, four successive conventional flight plans are used up to carry out the same mission. Each conventional flight plan consists of a waypoint set connecting a single departure airport or heliport to a single destination airport or heliport. The conventional flight plan can comprise a departure procedure and an arrival procedure optionally including the missed approach procedure.

Figure 6A:
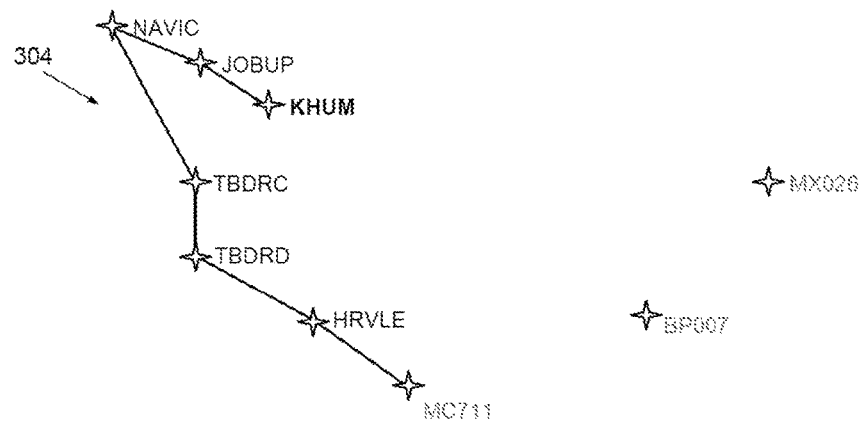
FIGS. 6A, 6B, 6C, 6D are the respective views of the successive flight plans implemented according to the prior art to carry out the same multi-destination servicing mission as that carried out by the single flight plan according to the invention of FIG. 5.
Figure 6B:
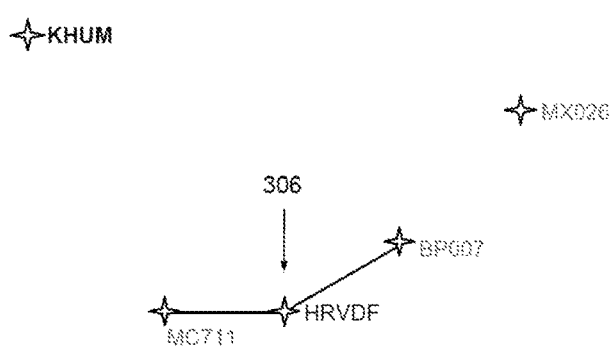

Once the first destination is reached in the first conventional flight plan 304 of FIG. 6A, here the first arrival point MC711, the first flight plan is used up and the crew must insert a new flight plan, here a second flight plan 306 such as illustrated in FIG. 6B to a second destination BP007.

Figure 6C:
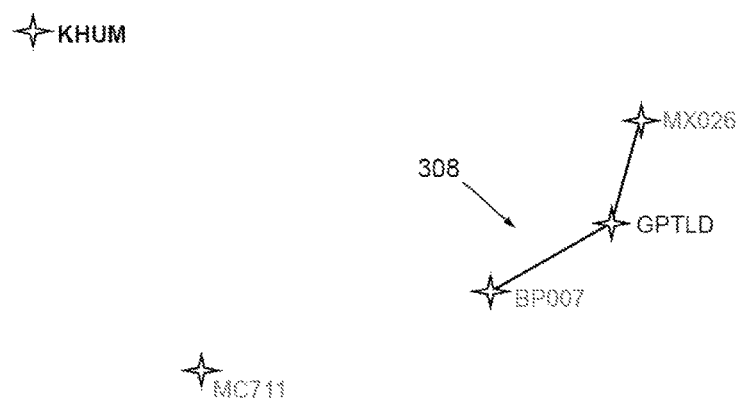

Once the second destination BP007 is reached in the second conventional flight plan 306 of FIG. 6B, the second flight plan is used up and the crew must insert a new flight plan, here a third flight plan 308 such as illustrated in FIG. 6C to a next destination MX026.

Figure 6D:
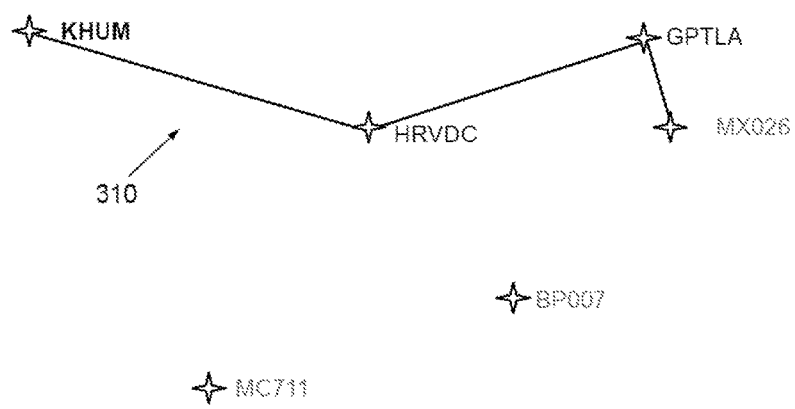

Once the third destination MX026 is reached in the third conventional flight plan 308 of FIG. 6C, the third flight plan is used up and the crew must insert a new flight plan, here a fourth flight plan 310 such as illustrated in FIG. 6D to the departure base KHUM of the mission.

Thus, it is apparent that the management method 102 for a single flight plan, integrating multiple intermediate touchdown points and illustrated in FIG. 5, further facilitates the preparation and management of a "cabotage" mission having to service several touchdown points (cabotage), that a method of multiple management of successive flight plans such as are illustrated in FIGS. 6A-6D does not do.

The fields of exploitation of multi-destination flight management methods and systems according to the invention described hereinabove are for example the following:

offshore oil exploitation during which relief personnel take over and freight deliveries are made;

military logistics missions such as the resupplying of ground troops and/or the evacuation of the injured;

cabotage missions performed by a civil aircraft, notably a helicopter.

It should be noted that document FR 2 910 678 A1 describes in a known manner a multi-destination initial flight plan which integrates right from preparation with the aid of a tree-like superstructure a succession of flight plans in which the intermediate arrival procedures are all activated. Thus, an intermediate touchdown point of the invention differs from a stopover point of this document FR 2 910 678 A1 in that it is an object point of the flight plan, integrated initially into the initial flight plan with an intermediate arrival procedure ready to be activated in the flight plan upon simple activation of a corresponding computer link. This object point is structured and programmed to:

become and be an operational stopover point in the sense of D1 when it is the said touchdown point whose turn it is to be reached in the sequence of the initial flight plan via automatic activation by activating automatically, through simple activation of the associated computer link prepared in the initial flight plan, the associated intermediate arrival procedure in a modified flight plan, and again become when so desired by the crew and as long as the activation of the associated intermediate arrival procedure has not been engaged a simple operational waypoint via simple deactivation of its state as touchdown point.

In contradistinction to document FR 2 910 678 A1 which requires a different FMS which is more powerful in terms of processing performance than current FMSs, the touchdown points of the invention make it possible for just a single intermediate arrival procedure to be activated at a time during the aircraft's multi-destination flight plan, this being compatible with the computational and processing capacity of current FMSs which can only manage a maximum of two activated flight procedures placed end-to-end.

The invention claimed is:

1. A method for managing a multi-destination flight of an aircraft implemented by an avionics onboard flight management system, comprising a first step consisting in:

constructing an initial flight plan of a mission with the flight management system having a start and an end on a basis of an endmost departure point, of an endmost arrival point, and of a series of temporally ordered waypoints of the aircraft between the endmost departure point corresponding to a start of the mission and the endmost arrival point corresponding to an end of the mission, the endmost departure point, the endmost arrival point, and the waypoints being extracted from a navigation database of the aircraft and/or input by a crew;

the said management method being implemented by the flight management system and comprising a second step, executed after the first step, and a third step, executed after the second step;

the second step consisting in receiving with the flight management system a selection from the crew of one or more waypoints from among the waypoints defining the initial flight plan constructed, and modifying with the flight management system the selected waypoint or waypoints into one or more corresponding intermediate touchdown points, each intermediate touchdown point having the same initial coordinates as the corresponding waypoint, and the flight management system being configured to activate a dedicated intermediate arrival procedure in a modified and updated flight plan; and the third step consisting in activating with the flight management system the dedicated intermediate arrival procedure associated with a next current intermediate touchdown point, not yet reached and to be serviced, from among the intermediate touchdown points remaining to be serviced, the activation of the dedicated intermediate arrival procedure being implemented with the flight management system; and displaying on one or more displays the modified and updated flight plan and information tables to elements of the modified and updated flight plan, wherein the flight management system operates in conjunction with one or more of a geolocation device, a navigation database, and a performance database.

2. The method for managing a multi-destination flight according to claim 1, wherein for each intermediate touchdown point, the intermediate arrival procedure comprises a first intermediate nominal approach procedure and a second intermediate interrupted approach procedure, the first intermediate nominal approach procedure being configured to be activated based on a priority with respect to the one second intermediate interrupted approach procedure, and/or the intermediate arrival procedure is selected from the navigation database of the aircraft and/or input by the crew, and then related to their respective intermediate touchdown point during the second step, and/or at least one intermediate touchdown point has a dedicated intermediate departure procedure created by the flight management system during the second step, and/or the navigation database of the aircraft comprises a first database containing departure and arrival procedures, airports, waypoints and beacons, published by states and coded according to a format standardized by AEEC A424, and a pilot database containing departure and arrival procedures, airports, waypoints and beacons, created by the crew or a company to mitigate items missing from the first database.

3. The method for managing a multi-destination flight according to claim 1, wherein each touchdown point, created during the second step as a modification of a selected waypoint, includes a set, associated with the said touchdown point, of default prediction parameters included among an estimated touchdown time, an estimated approach time, an estimated departure time, and an estimation of fuel consumed during corresponding intermediate approach and departure phases, and predicted weights of fuel, of freight and of passengers, the estimated touchdown time being inserted by the crew in the form of a default setting, the estimated approach time and the estimated departure time being either inserted by the crew or an external mission preparation system in a form of a first approach time default setting and of a second approach time default setting, or estimated by the flight management system.

4. The method for managing a multi-destination flight according to claim 1, wherein the third step also consists in activating another intermediate arrival procedure associated with the next current intermediate touchdown point, not yet reached and to be serviced, from among the intermediate touchdown points remaining to be serviced, and constructing a nominal-approach and intermediate missed-approach leg, each made up of intermediate-approach paths, on a basis of the activated intermediate arrival procedure, and inserting the said constructed nominal-approach and an intermediate interrupted-approach leg before another next current intermediate touchdown point, and then saving the flight plan thus modified as an updated flight plan.

5. The method for managing a multi-destination flight according to claim 4 wherein, activating, when the next current intermediate touchdown point, not yet reached and to be serviced, by the flight management system during the second step, a dedicated intermediate departure procedure, and constructing an intermediate departure leg, made up of a sequence of intermediate departure paths, on a basis of the activated intermediate departure procedure, and inserting the said intermediate departure leg constructed after the next current intermediate touchdown point, not yet reached and to be serviced, and integrating the insertion of the said intermediate departure leg into the updating of the flight plan.

6. The method for managing a multi-destination flight according to claim 4, wherein at an end of the third step, an updating of trajectory predictions is performed which takes into account the insertion of an intermediate nominal approach leg or of an intermediate interrupted approach leg.

7. The method for managing a multi-destination flight according to claim 4, comprising a fourth step, executed after the third step and during a phase of touchdown at a current intermediate touchdown point which has just been reached, the fourth step consisting in updating prediction parameters at the current intermediate touchdown point relating to weight of fuel, of freight and of passengers, a quantity of fuel being updated automatically by reading of one or more fuel gauges when the aircraft's avionics system so allows or fed in by crew input during a refuelling operation; and then updating predictions over an entire flight plan in terms of time and of fuel available on a basis of the update of prediction parameters at the touchdown point and of an approach leg of a current touchdown point actually flown.

8. The method for managing a multi-destination flight according to claim 7, wherein the flight management system searches for whether there exists a next current intermediate touchdown point, not yet reached and to be serviced, and in the affirmative, the execution of the third step is repeated during or after the phase of touchdown at the current intermediate touchdown point.

9. The method for managing a multi-destination flight according to claim 1, wherein
when a command input by the crew prescribes:
a deletion of a touchdown point not yet serviced, or
an inverse modification of a touchdown point not yet serviced into a corresponding waypoint, or
an addition of a touchdown point before or after the next touchdown point not yet serviced,
the third step is immediately executed again.

10. The method for managing a multi-destination flight according to claim 1, comprising a first telescopic display step comprising:
displaying the intermediate touchdown point or points distinguished from the other points of the said flight plan by a characteristic colour and/or symbol, and identified by an identification label, and
wherein the first telescopic display step further comprises:
displaying in a first configuration, the next intermediate touchdown point not yet reached; and
displaying in a second configuration upon command actuated by the crew or upon automatic command, the next intermediate touchdown point not yet reached which displays an intermediate approach leg and optionally departure leg corresponding respectively to activated intermediate arrival and departure procedures of the said next intermediate touchdown point, and other intermediate touchdowns.

11. The method for managing a multi-destination flight according to claim 1, comprising a second display step for implementing the multi-destination management method defined according to claim 1, and the second display step comprising:
receiving a direct modification of a selected waypoint into an intermediate touchdown point with the same coordinates by inputting through one or more input pages created by the flight management system to activate the dedicated intermediate arrival procedure, and to activate a dedicated intermediate departure procedure, and determining a set of default prediction parameters included among an estimated touchdown time, an estimated approach time, an estimated departure time, and an estimation of fuel consumed during corresponding intermediate approach and departure phases, and a forecast of weights of fuel, of freight and of passengers; and allowing
an inverse modification of a selected intermediate touchdown point into a waypoint with the same coordinates.

12. A system for multi-destination flight management of an aircraft comprising:
one or more electronic processing computers,
at least one man-machine interface for inputting data to allow a crew to enter data into the flight management system;
one or more displays to display one or more flight plans and information tables relating to elements of the flight plan;
the flight management system being configured to, in a first step, construct an initial flight plan of a mission having a start and an end on a basis of an endmost departure point, of an endmost arrival point, and of a series of temporally ordered waypoints of the aircraft between the endmost departure point corresponding to the start of the mission and the endmost arrival point corresponding to an end of the mission, the endmost departure point, the endmost arrival point and the waypoints being selected from a navigation database of the aircraft and/or input by a crew; and
the flight management system being configured to, in a second step, executed after the first step, select one or more waypoints from among the waypoints selected in the initial flight plan, and
the flight management system being configured to modify the selected waypoint or waypoints into one or more corresponding intermediate touchdown points,
each intermediate touchdown point having the same initial coordinates as the corresponding waypoint of which it is modified, and
each intermediate touchdown point comprising a dedicated intermediate arrival procedure created by the flight management system in a modified and updated flight plan; and then
the flight management system being configured to, in a third step, executed after the second step, activate the dedicated intermediate arrival procedure associated with a next current intermediate touchdown point, not yet reached and to be serviced, from among the intermediate touchdown points remaining to be serviced, the activation of the intermediate arrival procedure being implemented with the flight management system,
wherein the flight management system operates in conjunction with one or more of a geolocation device, the navigation database, and a performance database.

13. A display for aiding the management of a multi-destination flight of an aircraft comprising a first display screen configured to implement the management method defined according to claim 1, and allow telescopic display of the flight plan,
in which display of the intermediate touchdown point or points are distinguished from the other points of the said flight plan by a characteristic colour and/or symbol, and identified by an identification label, and
in which the display is configured such that:
in a first configuration, the next intermediate touchdown point not yet reached is in an expanded display mode, and the other intermediate touchdown points are in a minimized display mode; and
in a second configuration upon command actuated by the crew or upon automatic command, the next intermediate touchdown point not yet reached is in an expanded display mode which displays the intermediate approach leg and optionally departure leg corresponding respectively to activated intermediate arrival and departure procedures of the said next intermediate touchdown point, and other intermediate touchdowns are in a minimized display mode.

14. A display for aiding the management of a multi-destination flight of an aircraft comprising a first display screen configured to implement the management method defined according to claim 1, and allow telescopic display of the flight plan,
in which display of the intermediate touchdown point or points are distinguished from the other points of the said flight plan by a characteristic colour and/or symbol, and identified by an identification label, and
in which the display is configured such that:
in a first configuration, the next intermediate touchdown point not yet reached is in an expanded display mode, and the other intermediate touchdown points are in a minimized display mode; and in a second configuration upon command actuated by the crew or upon automatic command, the next intermediate touchdown point not yet reached is in an expanded display mode which displays the intermediate approach leg and optionally departure leg corresponding respectively to activated intermediate arrival and departure procedures of the said next intermediate touchdown point, and other intermediate touchdowns are in a minimized display mode, the display further comprising a second display screen configured to implement the multi-destination management method defined according to claim 1, and the second display screen is configured to allow:

a direct modification of a selected waypoint into an intermediate touchdown point with the same coordinates by inputting through one or more input pages created by the flight management system to activate the dedicated intermediate arrival procedure, and to activate a dedicated intermediate departure procedure, and a set of default prediction parameters included among an estimated touchdown time, an estimated approach time, an estimated departure time, and an estimation of the fuel consumed during the corresponding intermediate approach and departure phases, and predicted weights of fuel, of freight and of passengers;

the inverse modification of a selected intermediate touchdown point into a waypoint with the same coordinates.

15. The display for aiding the management of a multi-destination flight of an aircraft according to claim 14, wherein the first display screen and the second display screen are combined into one and the same display device.

\* \* \* \* \*